Oct. 10, 1961   J. D. SCHWARTZ   3,003,897
METHOD FOR REMOVING WAX FROM ARTIFICIAL TEETH
Filed March 18, 1958
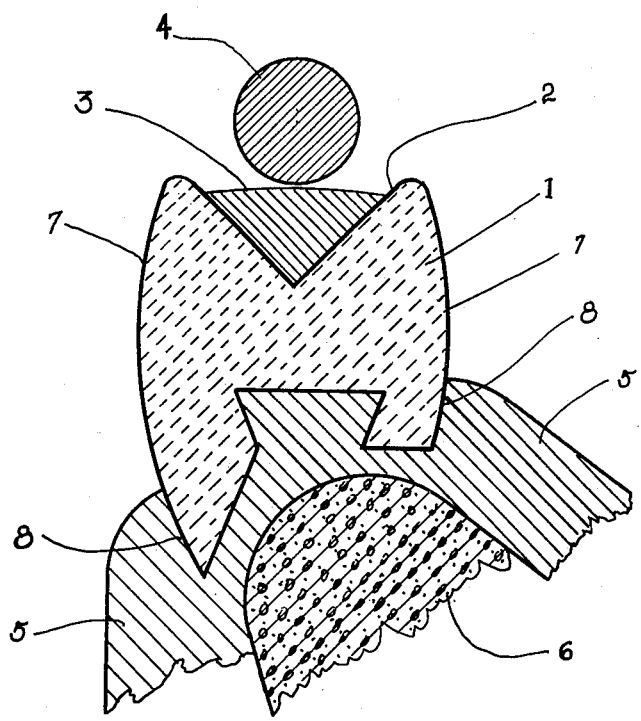
INVENTOR.
BY J. D. Schwartz United States Patent Office 3,003,897
Patented Oct. 10, 1961

3,003,897
METHOD FOR REMOVING WAX FROM ARTIFICIAL TEETH
Jacob D. Schwartz, 5710 Beacon St., Pittsburgh, Pa.
Filed Mar. 18, 1958, Ser. No. 722,162
4 Claims. (Cl. 134—4)

This invention relates in general to artificial dentures in wax form and more particularly to removal of excess base-plate wax from the grooves or sulci on the occlusal surface of the artificial porcelain teeth, prior to investment and subsequent processing into permanent plastic material of said waxed-up denture.

After artificial teeth are arranged in paraffin base-plate wax to form a waxed-up denture, part of each tooth will be imbedded in the wax and the remainder which is not imbedded must be meticulously free of base-plate wax because when the entire waxed-up denture is coated with plaster of Paris during the investment thereof in a denture flask, the plaster must have positive contact with the exposed surface of the teeth in order to adhere to the teeth and anchor them firmly in the plaster mold when it hardens. When the plaster mold has hardened, it is de-waxed by pouring boiling water into the mold and flushing out the wax, thus any wax on the surface of a tooth which is in contact with the plaster would also be flushed out and thereby leave a space between the tooth and plaster and would allow the tooth to fall out of the mold.

Removal of excess base-plate wax from the exposed surfaces of the teeth is very easily done save the wax contained in the grooves between the cusps on the occlusal surfaces, or sulci, as they are designated in anatomical nomenclature. The difficulty encountered in removing excess wax here stems from the fact that these grooves or sulci are very narrow and relatively deep. Thus it is customary to use a fine pointed metal instrument to penetrate to the bottom of the sulcus and to slowly and laboriously pick it out or to use a powerful wax solvent such as carbon tetrachloride to dissolve it and then with a dry cloth wipe the dissolved wax therefrom. Of the two methods, the latter is more widely used and is used with great reluctance because the volatile solvent is highly injurious to health if inhaled in appreciable quantity. Furthermore, the substance may be highly flammable, therefore dangerous to use in dental laboratories where Bunsen burners are extensively used. Also, after use, there usually remains a microscopic film of the dissolved wax on the tooth surface.

It is therefore, the principal object of the present invention to provide a method of and material for removal of excess base-plate wax from the grooves on the occlusal surface of artificial porcelain teeth which is simple and easy to use, which will remove the wax thoroughly, which will shorten the time normally required to perform this operation and the material used will be relatively inexpensive and harmless to human health when used.

These and other objects will become more apparent in the following description and accompanying drawing in which FIGURE 1 is a cross-sectional view through a posterior tooth in a waxed-up denture seated on a gypsum cast of an upper jaw showing residual base-plate wax in the groove between the cusps and a piece of the material, provided in this invention, positioned prior to being melted and fused to the residual wax.

Speaking generally and broadly, I accomplish the removal of the excess residual wax by first placing a piece of different kind of wax above the residual base-plate wax contained in the occlusal groove, which is at least equal in volume to the residual wax and which has a relatively high coefficient of thermal expansion, or relatively high melting point or both, compared to that of the base-plate wax, which is composed almost entirely of paraffin wax. I then fuse the two waxes together. The resulting wax mixture has a higher co-efficient of thermal expansion and higher melting point than the base-plate wax and on cooling it shrinks away from the tooth surface contained in the groove. Being hardened, shrunken and spaced from the tooth's surface, the wax mixture is easily lifted from the groove by a pointed metal instrument or stiff brush. This leaves the tooth truly free of all wax and the entire operation is safely performed in a matter of seconds.

I have found that for this purpose carnauba wax is singularly and particularly suited over many substances which I have tried. I have had varying degrees of success with many substances but none equal carnauba wax for this purpose. It is easily melted in a dental spatula, it is miscible with paraffin wax, it is not sticky and above all, it has an enormous degree of shrinkage from its molten to solid state. The latter quality, that of shrinkage, can be readily observed if one watches this wax cooling and solidifying from its molten state.

Referring now to the drawing in greater detail for a better understanding of the invention, reference character 1 points out the posterior porcelain tooth. The present invention works perfectly on porcelain teeth, however, in application on plastic teeth some damage may occur to the tooth due to the degree of heat involved in melting the waxes together. Some plastic teeth produce crazing on its surface due to the heat and others withstand the heat without visible harm. 2 represents the occlusal groove or sulcus of tooth 1, 3 is the residual base-plate wax contained in groove 2, 4 is a quantity of the material provided in this invention (the composition and requirements thereof will be described further in this description and the amount of this material used should be at least equal in volume to that of the residual wax 3), 5 is base-plate wax which form the base of the waxed-up denture, 6 is the ridge of a gypsum cast of an upper jaw on which the waxed-up denture is seated, 7 represents the exposed surface of tooth 1 and 8 is the unexposed surface of the tooth.

In practical operation, I employ the following method to remove the base-plate wax from groove 2. First, I remove all the base-plate wax from the entire exposed surface of tooth 1 except the base-plate wax 3 in the groove 2. I then dry the surface of the residual or remaining base-plate wax 3 in groove 2 by a blast of air or a piece of dry cloth. Then I place a small piece of carnauba wax 4 on top of the residual base-plate wax 3, which is at least equal in volume to that of the base-plate wax 3 and with a heated spatula or preferably a pointed metal instrument, I melt both waxes 3 and 4 and mix them together. The carnauba wax may also be applied from the end of a stick formed of this wax. This method, however, is slower and has a drawback because ofttimes too much wax is melted from the stick and the excess runs to areas of the tooth where it is undesirable. Another and a preferred method is to melt a small quantity of carnauba wax in a teaspoon and then with the cup end of a dental spatula carry a small quantity of the molten wax to the occlusal surface of the tooth where it will adhere to the residual wax and quickly harden. After all of the teeth to be treated have received carnauba wax, I heat a pointed metal instrument, melt and thoroughly mix the two waxes 3 and 4 together therewith. After applying carnauba wax, by whichever method is used, and the two waxes are thoroughly fused together, I allow the newly formed wax mixture to cool and harden either in the room atmosphere or under cold running tap water. It can then be observed by the naked eye that considerable shrinkage has taken place in the newly formed wax mixture to the extent that the mixture has pulled away from the surface of the tooth. I then lift the hardened wax mixture from the tooth groove 2, with a pointed metal instrument or stiff brush. Examination will then reveal that the excess wax in the groove 2 is removed in its entirety and not even a microscopic film of wax remains adhered to the tooth's surface in groove 2.

With reference to the composition of the additive material 4 provided in the present invention, I have determined that it must be capable of being melted in a dental spatula and have a melting point of at least 185 degrees F. this being higher than paraffin wax, which is the major and principle ingredient of base-plate wax and which in some species melts as high as about 170 degrees F. Since shrinkage of the additive material 4 causes it to separate from the tooth's surface, then, the greater the shrinkage, the better the material will be, all other conditions being equal. Melting temperature of the additive wax is also a factor in shrinkage because, for example, if a wax melts at 220 degrees F. it will then traverse 150 degrees F. in cooling to a room temperature of 70 degrees F. and since it shrinks a specific amount for each degree of cooling, in this case it will shrink 150 times that amount. Comparing this with the 170 degrees F. melting point of the residual paraffin wax it can be seen that the paraffin will traverse only 100 degrees F. in cooling to a 70 degrees F. room temperature. Also, the additive substance must be miscible with paraffin wax. Shellac, for example, is not miscible with paraffin wax and therefore, could not be used.

For the sake of clarity, by way of example, and because of its extraordinary quality of shrinkage, I employed carnauba wax as the additive in the above description. I do not, however, limit myself solely to this material since I have used other materials and combinations thereof with varying degrees of success in removing residual base-plate wax from the groove 2. Among materials I have used are rosin, gum damar and various combinations thereof. Experience has shown me, however, that carnauba wax functions best and is best in view of other considerations. I have also found that when an inert filler is added to the wax additive it become more efficacious for the task of removing residual wax from groove 2, because it aids very appreciably in forming a homogenous mixture of the residual wax and the additive wax. By inert filler I mean a material having a very high melting point and which does not form a chemical union with the additive wax when they are heated together, such as calcium or silica base powders. Of the various inert fillers I have used, such as powdered pumice, fuller's earth, calcium sulphate, magnesium oxide, magnesium carbonate, etc., I found that powdered calcium carbonate works best for the task at hand. One benefit it imparts to the additive wax is the turbulence it manifests in the molten wax. When carnauba wax mixed with powdered calcium carbonate is heated, for example, in a teaspoon, until the wax is melted, particles of the calcium carbonate will be seen to oscillate and cause a wave-like movement in the molten wax. Thus, when this mixture is melted and mixed with the molten residual wax in the groove 2, the turbulence of the calcium carbonate will aid in mixing the two waxes more thoroughly than otherwise. Another very important benefit rendered by the inert filler is its ability to carry heat to the interior of the additive wax rapidly, since it is a far better conductor of thermal changes than the wax. And yet another very important benefit produced by the calcium carbonate filler is to give body to the carnauba wax. Relatively high heat is required to melt the carnauba wax and thus when it is used without filler on the occlusal surface of the tooth, it runs off this surface onto other surfaces where it is undesirable and added work is created thereby in its removal therefrom. However, when inert filler is added, the mixture will not run off the occlusal surface regardless of the amount of heat applied thereto.

The degree of shrinkage of the additive is the factor which determines its efficiency to remove the residual wax. Most base-plate waxes shrink approximately 1.2 percent from a temperature reduction of from about 135 degrees F. to 68 degrees F. Therefore the additive wax, if it is to be effective for the task of removing the residual base-plate wax from the sulcus, must have a higher percentage shrinkage than 1.2 percent from 135 degrees F. to 68 degrees F. Since the inert filler does not have a relatively high degree of shrinkage, compared to the carnauba wax, then, in a given quantity of the mixture, the greater the amount of filler it contains, its degree of relative shrinkage is reduced. However, I have used a mixture containing equal parts by volume of calcium carbonate powder and carnauba wax with satisfactory results. I have also used a mixture containing only about five percent of calcium carbonate powder and 95 percent carnauba wax with satisfactory results. However, in this mixture there was a tendency for the material to flow onto the other surfaces of the tooth where it is unneeded and in the mixture containing 50 percent calcium carbonate powder the mixture was too sluggish to mix with the residual wax thoroughly. From this experience it appears that a mixture containing about 25 percent by volume of calcium carbonate powder and 75 percent carnauba wax, should give best results. Since dentists use base-plate waxes of greatly varying melting points, the composition of the additive material with respect to its contents of inert material apparently could be made to fit a particular melting point of the base-plate wax.

I have also used compositions of rosin and compositions of gum damar, plain and also to which was added an equal volume of an inert filler and I have had satisfactory results with them.

Having described the invention in one of its preferred embodiments, it being clearly understood that variations thereof may be made without departing from the spirit of the invention, I claim:

1. The method of removing wax from a sulcus on the occlusal surface of an artificial porcelain posterior tooth comprising the steps of melting by heat and mixing together a quantity of waxen material and said wax to be removed, said quantity of waxen material having a melting point of at least 185 degrees F., a shrinkage greater than 1.2 percent from 135 degrees F. to 68 degrees F. and being at least equal in volume to said wax to be removed, removing said heat to permit said molten wax to solidify, then lifting said solidified wax mixture from said sulcus.

2. The method of removing wax from a sulcus on the occlusal surface of an artificial porcelain posterior tooth comprising the steps of melting by heat and mixing together said wax to be removed and a quantity of carnauba wax the volume thereof being at last equal to that of said wax to be removed, removing said heat to permit said molten waxes to solidify, then lifting said solidified wax mixture from said sulcus.

3. The method of removing wax from a sulcus on the occlusal surface of an artificial porcelain posterior tooth comprising the steps of melting by heat and mixing together said wax to be removed and a quantity of waxen material, the volume thereof being at least equal to that of said wax to be removed and consisting of a mixture containing at least fifty percent by volume of carnauba wax and the remainder a powdered inert filler, removing said heat to permit said molten waxes to solidify, then lifting said solidified wax mixture from said sulcus.

4. The method of removing wax from a sulcus on the occlusal surface of an artificial posterior porcelain tooth comprising the steps of melting by heat and mixing together said wax to be removed and a quantity of waxen material, the volume thereof being at least equal to that of said wax to be removed and consisting of a mixture containing at least 50 percent by volume of carnauba wax and the remainder powdered calcium carbonate, removing said heat to permit said molten waxes to solidify, then lifting said solidified wax mixture from said sulcus.

References Cited in the file of this patent

UNITED STATES PATENTS

| | | |
|---|---|---|
| 404,483 | Hastings | June 4, 1889 |
| 687,685 | Heather | Nov. 26, 1901 |
| 793,048 | Brown | June 27, 1905 |
| 1,653,805 | Housekeeper | Dec. 27, 1927 |
| 2,495,729 | Hutson | Jan. 31, 1950 |